United States Patent [19]

Fleury

[11] Patent Number: 4,804,316
[45] Date of Patent: Feb. 14, 1989

[54] SUSPENSION FOR THE PIVOTING VANE ACTUATION MECHANISM OF A VARIABLE NOZZLE TURBOCHARGER

[75] Inventor: Jean-Luc Fleury, Manhattan Beach, Calif.

[73] Assignee: Allied-Signal Inc., Morristown, N.J.

[21] Appl. No.: 114,163

[22] Filed: Oct. 27, 1987

Related U.S. Application Data

[63] Continuation of Ser. No. 807,915, Dec. 11, 1985, abandoned.

[51] Int. Cl.$^4$ ...................... F02B 37/12; F01D 17/12
[52] U.S. Cl. .................................... 417/407; 415/134; 415/164
[58] Field of Search ............... 417/405, 406, 407; 60/600, 602; 415/163, 164, 134

[56] References Cited

U.S. PATENT DOCUMENTS

| | | | |
|---|---|---|---|
| 4,643,640 | 2/1987 | Burdette et al. | 415/164 |
| 4,654,941 | 4/1987 | Burdette et al. | 415/164 |
| 4,659,295 | 4/1987 | Burdette et al. | 417/407 |
| 4,702,672 | 10/1987 | Leicht et al. | 415/164 |

Primary Examiner—Louis J. Casaregola
Attorney, Agent, or Firm—Ken C. Decker

[57] ABSTRACT

An improved suspension for a pivoting vane actuation mechanism is incorporated into a variable nozzle turbocharger in order to prevent vane binding. The mechanism includes a plurality of rotatable vanes mounted to a nozzle ring and a means for rotating the plurality of vanes. The nozzle ring and the means for rotating are coupled together so that thermal growth does not cause misalignment of the two.

19 Claims, 4 Drawing Sheets

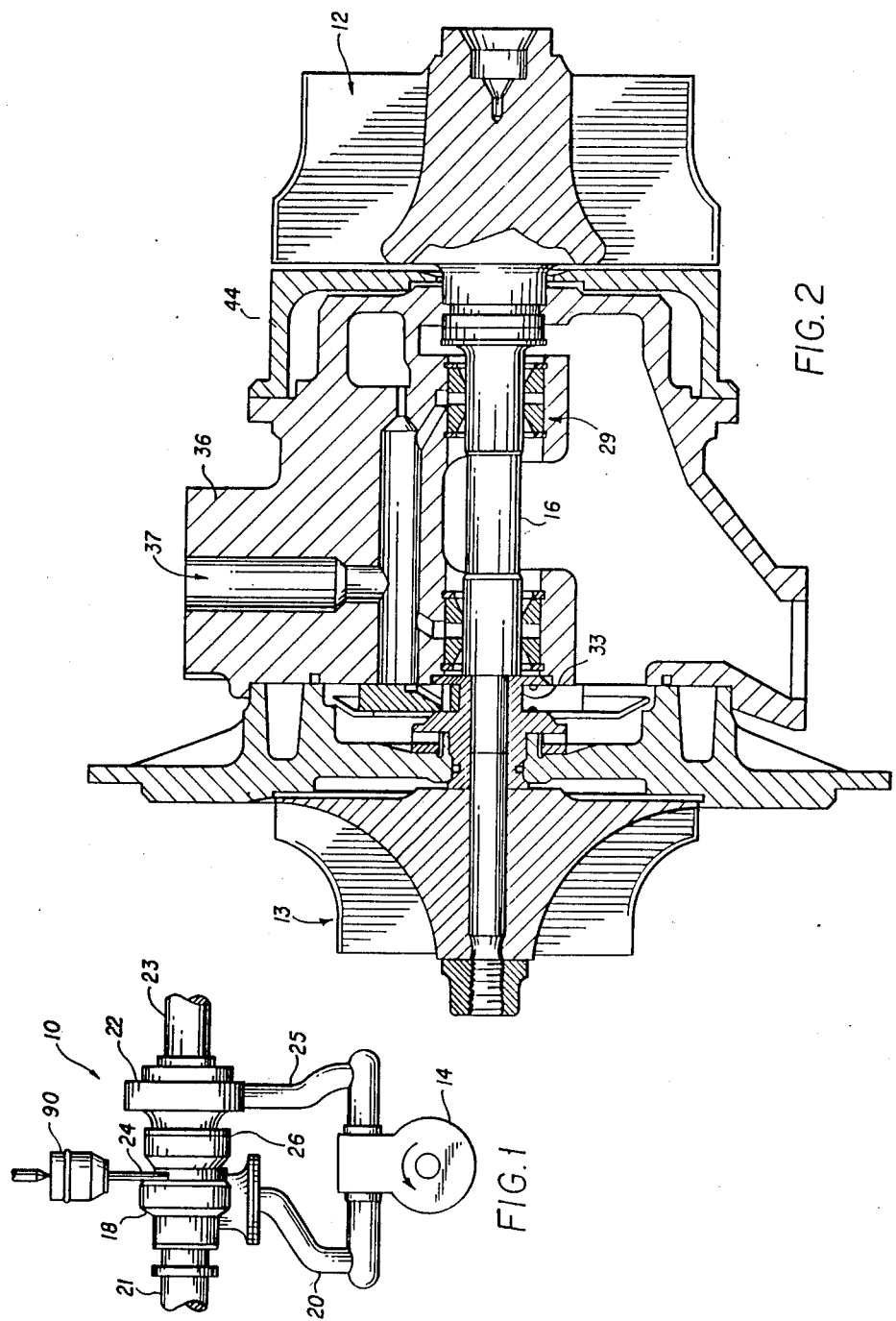

SUSPENSION FOR THE PIVOTING VANE ACTUATION MECHANISM OF A VARIABLE NOZZLE TURBOCHARGER

This is a continuation of application Ser. No. 807,915, filed 12/11/85, now abandoned.

BACKGROUND OF THE INVENTION

The present invention relates to turbomachinery and more particularly to an improved suspension design for the pivoting vane actuation mechanism of a variable nozzle turbocharger.

In turbomachinery in which the turbine is intended to drive a compressor or the like, it is often desirable to control the flow of motive gas to the turbine to improve its efficiency or operational range. In order to accomplish this, the nozzle passages leading to the turbine wheel may be of variable geometry. These variable geometry nozzle passages can be provided by means of a plurality of vanes which are pivotable so as to alter the configuration of the passages therebetween. The design of the suspension system used in association with the pivoting vane design is critical to prevent binding of either the suspension system or the vanes.

U.S. Pat. No. 2,860,827 and 4,179,247 disclose designs to prevent binding of the pivoting vane actuation mechanism. However, none of the above mentioned designs are suspension systems for an actuation system which accommodates the thermal cycling experienced by the turbine housing as well as the components of the actuation system.

SUMMARY OF THE INVENTION

In accordance with the present invention a suspension for the pivoting vane actuation mechanism of a variable nozzle turbocharger is disclosed. Rotatable guide vanes are mounted within an annular nozzle passageway immediately upstream of the turbine wheel. The nozzle ring is spring loaded against the turbine housing via spacer pins having an axial length slightly longer than the vanes.

An actuation mechanism for rotating the plurality of vanes, in the form of a unison ring, is provided within the turbocharger housing. Each vane has a vane arm associated therewith which connects the vanes to the unison ring such that rotation of the unison ring causes pivoting of the vanes. Thermal cycling, with attendant thermal growth of the structure, can also cause misalignment of the unison ring with respect to the vane arms thereby causing binding of the arms within the unsion ring or binding of the unison ring within the turbocharger housing, thereby preventing rotation of the vanes. The nozzle ring is aligned with the turbocharger housing via dowels extending between the two. These dowels also serve to carry rollers thereon. The rollers provide a surface on which the periphery of the unison ring rides. This new and improved suspension structure coaxially aligns the unison and nozzle rings and prevents any misalignment of the unison ring and the nozzle ring caused by thermal cycling.

It is an object of this invention to provide an improved actuation system for a variable nozzle turbine which eliminates binding of the system.

It is another object of this invention to provide an actuation system wherein the unison ring and nozzle ring remain concentrically aligned during operation.

It is a further object of this invention to provide a more reliable actuation system for a variable nozzle turbocharger.

It is another object of this invention to provide a nozzle ring which is continuously aligned with the turbine side wall to provide an annnular passage with a constant width.

BRIEF DESCRIPTION OF THE DRAWINGS

FIG. 1 is a diagramic view illustrating a turbocharged engine system;

FIG. 2 is a cross-sectional view of the internal components of an exhaust gas turbocharger;

DETAILED DESCRIPTION OF THE INVENTION

Figure 3:
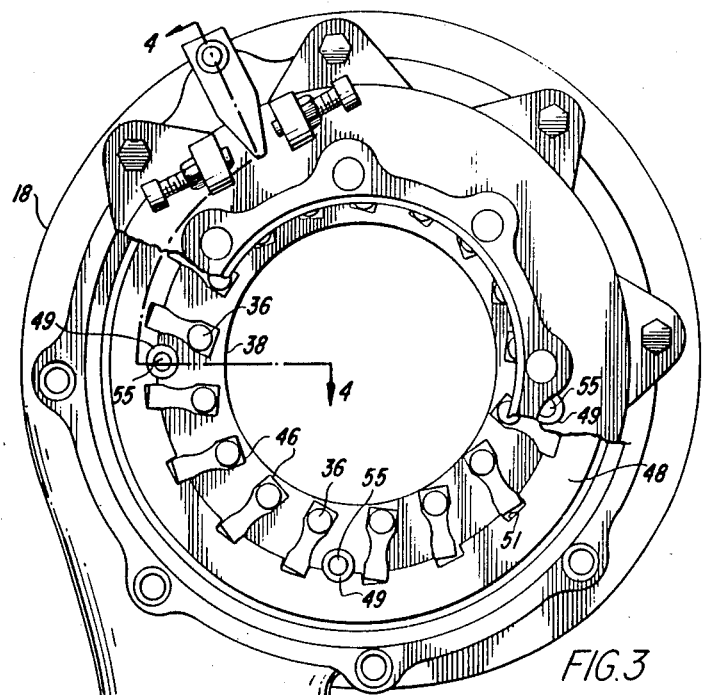
FIG. 3 is a sectional view of the turbine end of the turbocharger which includes the present invention.

An engine system as shown in the FIGS. 1-3 includes turbomachinery in the form of a turbocharger 10 generally comprising a turbine wheel 12 and a compressor impeller 13 mounted on opposite ends of a common shaft 16. The turbine wheel 12 is disposed within a turbine housing 18 which includes an inlet 20 for receiving exhaust gas from an engine 14 and an outlet 21 for discharging the exhaust gas. The turbine housing 18 guides the engine exhaust gas into communication with and expansion through the turbine wheel 12 for rotatably driving the turbine wheel. Such driving of the turbine wheel simultaneously and rotatably drives the compressor impeller 13 which is carried within a compressor housing 22. The compressor housing 22, including an inlet 23 and outlet 25 and the compressor impeller 13 cooperate to draw in and compress ambient air for supply to the intake of the engine 14.

The turbine housing 18 is mounted to a flange member 24 which in turn is mounted to center housing 26. The compressor housing 22 is mounted on the other side of the center housing 26. The center housing 26 includes a bearing means 29 for rotatably receiving and supporting the shaft 16. A thrust bearing assembly 33 is carried about the shaft adjacent the compressor housing for preventing axial excursions of the shaft 16. A heat shield 44 is positioned about the shaft 16 at the turbine end in order to insulate the center housing 26 from the harmful effects of the exhaust gas.

Lubricant such as engine oil or the like is supplied via the center housing 26 to the journal bearing means 29 and to the thrust bearing assembly 33. A lubricant inlet port 37 is formed in the center housing 26 and is adapted for connection to a suitable source of lubricant such as filtered engine oil. The port communicates with a network of internal supply passages which are formed in the center housing 26 to direct the lubricant to the appropriate bearings. The lubricant circulated to the bearings is collected in a suitable sump or drain for passage to appropriate filtering, cooling, and recirculation equipment, all in a well-known manner.

DETAILED DESCRIPTION OF THE PREFERRED EMBODIMENT

Figure 4:
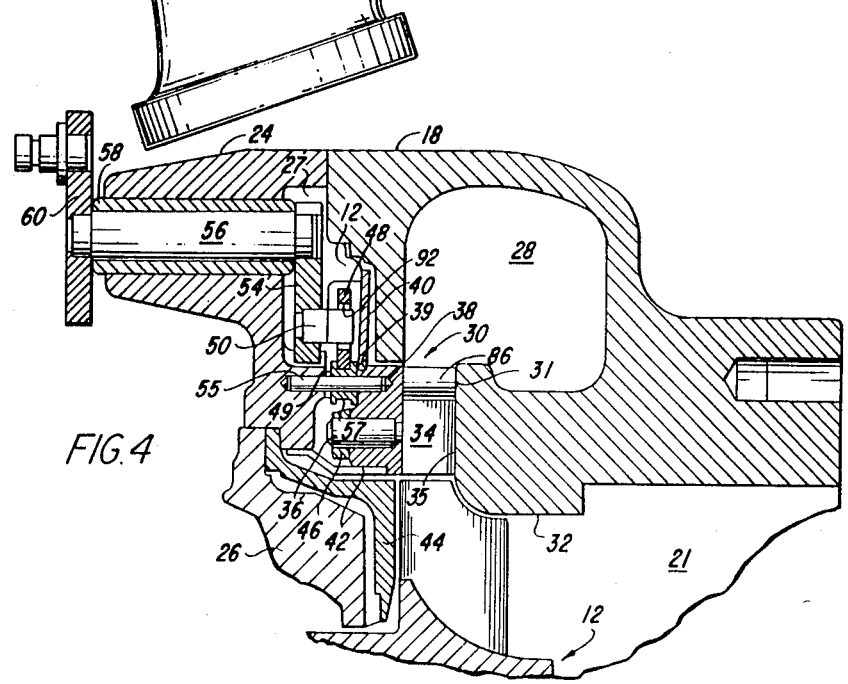
FIG. 4 is a partial sectional view of the turbine end of the turbocharger taken along line 4—4 of FIG. 3 of the preferred embodiment.
Figure 5:
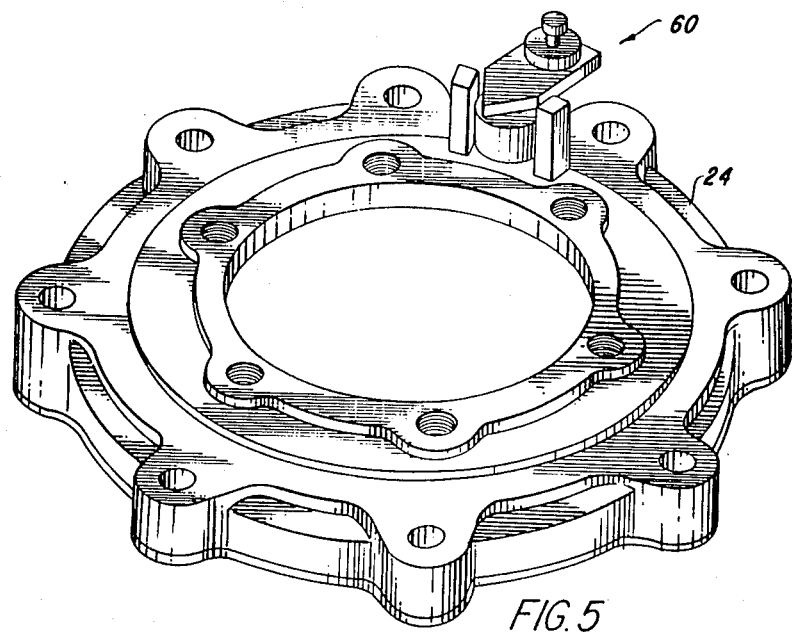
FIG. 5 is a plan view of the flange member.
Figure 6:
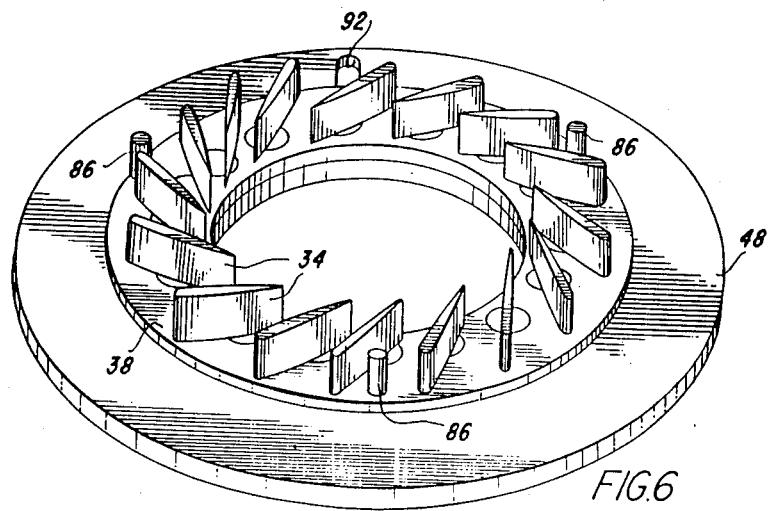
FIG. 6 is a plan view of the nozzle ring.

As shown in FIG. 4, the turbine housing 18 forms a generally scroll-shaped volute 28 which accepts the exhaust gas from the engine 14 and directs it onto the turbine wheel blades through an annular passage 30. Thereafter, the exhaust gas flows axially through the turbine shroud 32 and exits the turbocharger through outlet 21 either into a suitable pollution-control device or the atmosphere. Placed within the annular passageway 30 are a plurality of pivotable vanes 34 which operate to vary the geometry of the annular passage 30 to control the angle at which the exhaust gas impacts the blades of the turbine wheel 12. This in turn controls the amount of energy imparted to the comprssor wheel and ultimately the amount of air supplied to the engine.

The variable geometry turbine nozzle of the present invention is located between the center housing and turbine housing end of turbocharger 10. The flange member 24 and the turbine housing 18 form a cavity 27 between the two in their assembled state which locates the hardware used in conjunction with the variable geometry turbine nozzle as will be described below. The exhaust gas present within volute 28 flows through the annular passageway 30 formed by the inner or side wall 31 of the turbine housing 18 and an annular nozzle ring 38. Located circumferentially around and within the annular passage 30 are a plurality of vanes 34. The plurality of vanes is mounted to the nozzle ring 38 having a plurality of radially spaced bores therethrough to accommodate a vane pin 36 associated with each vane 34. Attached to the other end of each vane pin is a vane arm 46, the shape of which can be best seen in FIG. 3. The arm is attached to the vane pin 36 by welding thereby rotatably attaching the vanes 34 to the nozzle ring 38 such that the nozzle ring is between the vane and vane arm. However, any suitable method of attachment can be used.

Located within passage 30 are a plurality of spacers 86. As shown, spacers 86 are located at the periphery of the plurality of vanes and sized such that they have an axial length (with range of 0.002 to 0.006 inches) longer than the vane length. Spacers are press fit within a bore formed in nozzle ring 38 though any method of attaching the spacers to the nozzle ring or turbine side wall can be used.

Unison ring 48 is an annular ring with a plurality of slots 51 on its inner radial surface. Each slot receives a vane arm 46. At the inner periphery of the unison ring 48 are located at least three radially spaced rollers 49. Rollers 49 are rotatably mounted on dowels 55 radially inwardly of the unison ring and are secured between the flange member 24 and nozzle ring 38, each having bores for acceptance of the dowel. Dowels 55 have some axial clearance within these bores in order to allow nozzle ring 38 slight axial movement. Rollers 49 include an annular groove 59 therearound for acceptance of the inner periphery of the unison ring 48. Dowels 55 and rollers 49 could be provided at the periphery of the unison ring 48 if so desired. Dowels 55 further perform the function of preventing the nozzle ring 38 from rotating. These rollers 49 provide for ease of rotation of the unison ring 48 relative to the flange member 24 and together with dowels 55 ensure the concentricity between unison ring 48 and nozzle ring 38 and the concentricity between the nozzle ring and flange member. The shape of the vane arms 46 must be such as to maintain basically a rolling action within slots 51 to avoid binding within unison ring 48 as it rotates to pivot vanes 34.

Flange member 24 includes a recessed portion for acceptance of the actuation system as will be described below. Formed in flange member 24 is a shoulder 72 which acts in cooperation with belleville spring 40. The inboard side (that side facing the center housing) of the radially outer edge of spring 40 rests against the shoulder 72, and when assembled the outboard side of the radially inner edge of the spring acts against the shoulder portion 39 of nozzle ring 38 such that it loads the nozzle ring 38 and the pins 86 against the side wall 31. Shoulder 72 is continuous about flange 24 with the exception of a break to make room for the bell crank system defined below.

Tube member 42 is generally cylindrically shaped with an annular bend therein. Tube member 42 is sized as that it is slidably engageable within the inner radial surface of the nozzle ring 38. The tube member 42 acts as a seal in the event any exhaust gas leaks behind the nozzle ring 38 and into the cavity 27 formed between the flange 24 and the turbine housing 18, thereby sealing the turbine housing 18 from the center housing 26.

In order to rotate the unison ring 48 between its two extreme positions which correspond to the limits of the geometry of the annular passage 30, a bell crank system is used. A pin 50 is rigidly connected to a first linkage member 54 at one end thereof. The pin 50 fits within a corresponding slot 92 within the unison ring 48 in order to transmit any movement in the bell crank to the unison ring 48. The first linkage member 54 is rigidly connected at its other end to a rod member 56. The rod 56 projects through a bore 57 in the flange member 24 to a point outside the turbocharger assembly. Bushing 58 is used in association with rod 56. The rod 56 is rigidly connected at its other end to a second linkage member 60 which in turn is connected to an actuator 90, shown in FIG. 1. The actuator shown in a vacuum boost type which is well known in the art. Furthermore, it is envisioned that other actuator means can be used to control the movement of the vanes.

During operation, movement of the second linkage member 60 is translated into movement of the first linkage member 54 via rod 56. The existence of pin 50 will translate any movement of the first linkage member 54 into rotational movement of unison ring 48. In turn, vane arms 46 roll against the side wall of slots 51 to pivot vanes 34 while nozzle ring 38 remains stationary. Thus there is a change in the geometry of the plurality of passageways formed between adjacent vanes.

Figure 7:
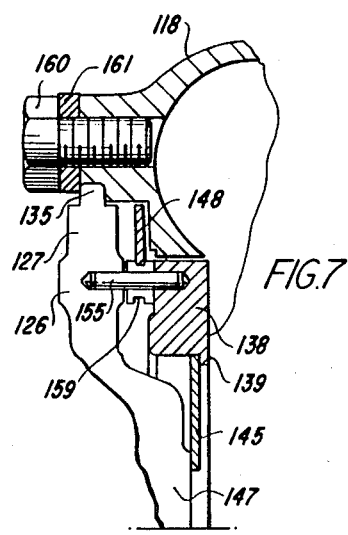
FIG. 7 is a partial sectional view of the suspension system taken along line 7—7 of FIG. 10.

An alternative embodiment of the invention is shown in FIGS. 7-11. FIG. 7 is a partial sectional view of the nozzle and unison rings, 138 and 148 respectively. The center housing 126 has not been shown for the sake of clarity, however FIGS. 8-11 do include partial views of center housing 126 and FIG. 10 includes a partial view of turbine housing 118.

Figure 10:
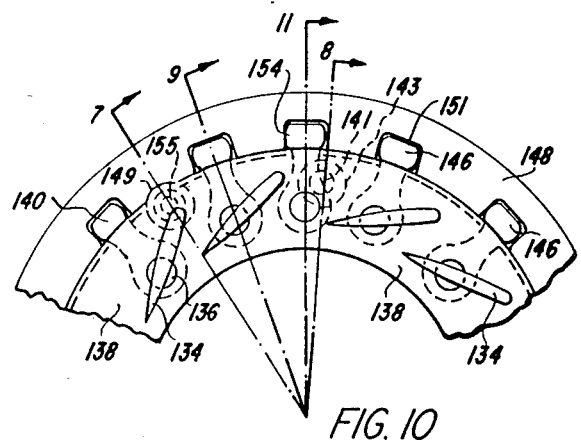
FIG. 10 is a partial plan view of the nozzle ring of the alternative embodiment.

As shown best in FIG. 10, the turbine housing 118 forms a generally scroll-shaped volute 128 which accepts the exhaust gas from the engine. Thereafter, the exhaust gas flows axially through the turbine shroud 132 and exits the turbocharger through outlet 121. Located within the annular passageway 130 are a plurality of pivotable vanes 134 which operate to vary the geometry of the annular passage 130 to control the angle at which the exhaust gas impacts the turbine wheel and ultimately the amount of air supplied to the engine.

Figure 8:
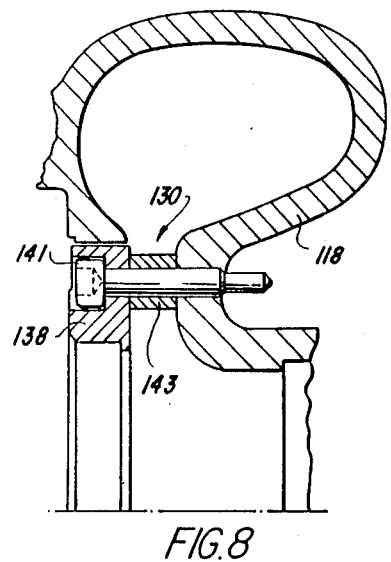
FIG. 8 is a partial sectional view of the spacer taken along line 8—8 of FIG. 10.

The alternative embodiment eliminates the flange member 24 and instead attaches the nozzle ring 138 to the turbine housing 118 as best shown in FIG. 8. Specifically nozzle ring 138 is bolted directly to the turbine housing 118 so as to form the annular passageway 130 therebetween. Associated with each bolt 141 is a spacer 143 which has an axial length slightly longer than the axial length of the vanes 134. Spacers 134 prevent binding of the vanes as the spacers 86 do in the preferred embodiment.

Figure 9:
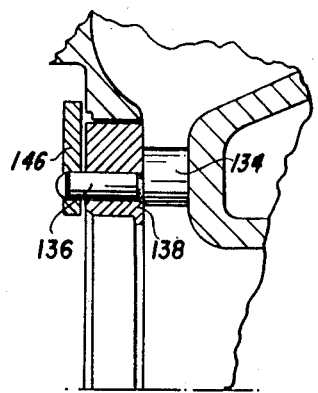
FIG. 9 is a partial sectional view of a vane and vane arm taken along line 9—9 of FIG. 10.

As shown in FIG. 9, the plurality of vanes is mounted to nozzle ring 138 having a plurality of radially spaced bores therethrough to accommodate a vane pin 136 associated with each vane 134. Attached to the other end of the vane pin is a vane arm 146. Arm 146 is attached to vane pin 136 by any suitable method of attachment such that the nozzle ring 138 is located between the vane 134 and the vane arm 146.

FIG. 10 shows that unison ring 148 is an annular ring with a plurality of slots 151 on its inner radial surface. Each slot receives a vane arm 146. Located at the internal periphery of the unison ring 148 are at least three spaced rollers 149. Rollers 149 are rotatably mounted on dowels 155 spaced radially inwardly of the unison ring and secured between the nozzle ring 138 and center housing 126; each having bores therein for acceptance and location of the dowels. Rollers 149 include an annular groove 159 therearound for acceptance and guidance of the inner periphery of the unison ring. Rollers 149 and dowels 155 ensure the concentricity between the unison ring 148 and nozzle ring 138.

Figure 11:
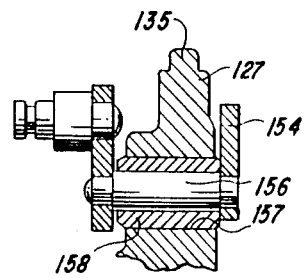
FIG. 11 is a partial sectional view of the bell crank system taken along line 11—11 of FIG. 10.

The alternative embodiment has eliminated several elements of the preferred embodiment i.e. the flange member 24 and tube member 42. Center housing 126 is different in that it includes a radially outwardly extending flange portion 127 having a bore 57 therethrough for acceptance of the actuation system as shown in FIG. 11. Furthermore, the flange portion 127 includes shoulder 135 shaped to mate with the turbine housing 118 and an annular land 147 above the central bore.

As shown in FIG. 7, an annular disc 145 is positioned about the turbocharger shaft such that its radially inner edge rests against the land 147 and its radially outer edge rests against a shoulder 139 formed on the inner periphery of nozzle ring 138. Disc 145 functions as a heat shield and seal to prevent heat and exhaust gas leakage around nozzle ring 138.

As best seen in FIG. 11, the actuation system is similar to the actuation system in the preferred embodiment except in two respects. Rod 156 and bushing 158 extend through a bore 157 formed center housing 126 as stated above and first linkage member 54 has been replaced by a linkage member 154 which is shaped like a vane arm 146. Linkage member 154 can therefore fit into a slot 151 in unison ring 148 in order to rotate it and the plurality of vanes 134.

Various modifications to the depicted and described apparatus will be apparent to those skilled in the art. Accordingly, the foregoing detailed description of the preferred embodiment of the invention shoulder be considered exemplary in nature, and not as limiting to the scope and spirit of the invention as set forth in the appended claims. For example, it is envisioned that the flange member can be part and parcel of the center housing.

Having described the invention with sufficient clarity that those skilled in the art may practice it, I claim:

1. A turbocharger comprising:
   an exhaust gas driven turbine rotatably mounted to a shaft having a compressor impeller thereon;
   a compressor housing enclosing said compressor impeller;
   a center housing including bearing means for rotatably supporting the shaft;
   a turbine housing forming a volute therein for directing exhaust gas from an engine through an annular passage to said turbine and including a turbine side wall which defines one boundary of said annular passage;
   a flange member mounted between said center housing and said turbine housing;
   a nozzle ring defining one boundary of said annular passage;
   a plurality of vanes pivotably mounted to said nozzle ring;
   means for maintaining said nozzle ring a desired distance from said turbine side wall during turbocharger operation;
   a vane pin associated with each pivotable vane rotatably mounted through said nozzle ring;
   a vane ram rigidly attached to the vane pin such that the nozzle ring is located between the vane and the vane arm;
   an annular unison ring having a plurality of slots for receiving the vane arms therein;
   at least three dowels extending from within a bore in said flange member to within a bore in said nozzle ring;
   a roller rotatably mounted to each dowel, said rollers engaging the inner periphery of said unison ring; and
   a linkage means responsive to an actuator means, for rotating the unison ring.

2. The turbocharger according to claim 1 wherein the linkage means includes a pin means engageable within a bore in the unison ring and attached to a first linkage member, said first linkage member rigidly connected to a rod member rotatable about its axis and having a second linkage member attached to its other end, and actuator means attached to the second linkage member for rotating the second linkage member about the rod member.

3. The turbocharger according to claim 2 wherein the rod member extends through a bore in the flange member to a point outside of the flange member and includes a bushing therearound.

4. The turbocharger according to claim 1 wherein said means for maintaining comprises at least three spacers attached to said nozzle ring and a bellville spring biasing the nozzle ring such that said spacer abuts against said turbine side wall.

5. The turbocharger according to claim 4 wherein said spacer has an axial length slightly larger than the axial width of the vanes.

6. The turbocharger according to claim 1 wherein said means for maintaining comprises a cylindrical spacer and a bolt solid through said spacer and securing the nozzle ring a spaced distance from said turbine side wall.

7. The turbocharger according to claim 6 wherein said spacer has an axial length slightly longer than the axial length of the vane.

8. The turbocharger of claim 7 wherein the distance between the extreme axial ends of the bores is longer than the axial length of said dowel.

9. The turbocharger of claim 8 wherein said bore diameters are larger than the dowel diameter.

10. A turbocharger for supplying compressed air to an engine including an exhaust gas driven turbine rotatably mounted to a shaft having a compressor rotatably mounted thereon, a turbine housing having an inner wall forming a volute therein for directing exhaust gas from said engine through an annular passage to said turbine and including a turbine side wall which defines one boundary of said annular passage, and means for varying the effective flow area of said annular passage comprising:

an annular nozzle ring defining one boundary of said annular passage;

a plurality of vanes pivotably mounted to said nozzle ring, each vane having a vane arm associated therewith;

an annular unison ring having a plurality of slots for receiving said vane arms;

means for pivoting said vanes; and at least three dowels extending from a bore in the turbocharger to a bore in said nozzle ring and including a roller mounted theron for engaging the inner periphery of said annular unison ring; and a spring means for biasing said nozzle ring toward said turbine side wall.

11. The turbocharger of claim 10 wherein the distance between the extreme axial ends of the bores is longer than the axial length of said dowel.

12. The turbocharger of claim 11 wherein said bore diameters are slightly larger than the dowel diameter.

13. The turbocharger of claim 12 wherein the periphery of said unison ring is in rolling contact with said rollers.

14. The turbocharger of claim 12 further including at least one spacer between said nozzle ring and turbine side wall, said spacer having an axial length slightly greater than the axial length of said plurality of vanes.

15. In a turbocharger having an exhaust gas driven turbine rotatably mounted to a shaft having a compressor impeller thereon, a compressor housing enclosing said compressor impeller, a center housing including bearing means for rotatably supporting the shaft, a method of assembling the turbocharger comprising:

mounting a flange member to the center housing;

pivotably mounting a plurality of vanes to an annular nozzle ring;

slidably mounting at least three dowels into at least three bores in said nozzle ring;

slidably and rotatably mounting a roller to each dowel;

mounting, in rolling contact, an annular unison ring on said rollers;

aligning said dowels with bores formed in the flange member and sliding the dowel ends therein;

securing a turbine housing defining a volute therein and including a side wall to the flange member; and simultaneously spring loading said nozzle ring a spaced distance from said turbine side wall.

16. The method according to claim 15 wherein the step of pivotably mounting said vanes includes the step of attaching a vane pin to said vane and a vane arm to the vane pin on the other side of said nozzle ring.

17. The method of claim 16 further including the steps of forming a plurality of slots on the periphery of the unison ring and aligning each vane arm with a slot.

18. The turbocharger of claim 10 further including means for maintaining said nozzle ring to said turbine side wall at a desired spaced distance.

19. The turbocharger of claim 18 wherein said means for maintaining comprises a cylindrically shaped sensor between the nozzle ring and turbine side wall and a bolt extending through said spacer and securing said nozzle ring and turbine side wall.

* * * * *